Patented Dec. 23, 1941

2,266,890

UNITED STATES PATENT OFFICE 2,266,890

PROCESS FOR PRINTING DYESTUFFS OF THE DIPYRAZOLANTHRONYL SERIES

Charles F. Miller, Wilmington, Del., assignor to E. I. du Pont de Nemours & Company, Wilmington, Del., a corporation of Delaware No Drawing. Application November 24, 1939, Serial No. 305,924

9 Claims. (Cl. 8—70)

This invention relates to an improved process for printing vat dyestuffs of the dipyrazolanthronyl series.

The N,N'-dialkyl- and the N-alkyl-N'-aralkyl-dipyrazolanthronyls which have been recognized as valuable vat dyeing colors are limited in their use because of their poor printing properties, for it has been recognized that these dipyrazolanthronyl dyes give prints that are deficient in fullness, brightness and depth of shade when applied by the conventional printing methods, and are therefore of no real value as printing colors.

While attempts have been made to improve the printing properties of these colors by introducing various substituents into the molecule the introduced substituent usually varies the shade of the dyestuff, in some cases alters its dyeing and fastness properties and invariably it adds materially to the cost of the desired dyestuff.

It is therefore an object of this invention to provide a process whereby the dyes of the dipyrazolanthronyl series can be printed in full bright shades by the conventional alkali carbonate, alkali sulfoxylate-formaldehyde method. It is a further object of the invention to provide vat color assistant pastes of dyes of the dipyrazolanthronyl series which can be added to the conventional printing pastes to give full bright prints when printed and developed by the usual vat dye printing methods.

I have found that the commercial dyes of the dipyrazolanthronyl series which have heretofore been of no value as printing colors can be printed in full bright shades with the usual carbonate, sulfoxylate-formaldehyde printing pastes when there is added to the dyestuff printing paste preparation, triethanolamine and a small amount of a salt, oxide or hydroxide of a metal of the class consisting of ferrous iron, zinc, tin and copper.

The assistants may be added to the printing composition or they may be incorporated with the vat color to form an assistant color paste which may be added to the conventionl printing paste preparations.

I have found that the amount of triethanolamine that may be used can be varied within wide limits. From 4 to 10 parts of the triethanolamine with from 0.1 to 0.2 part of the metallic salt, oxide or hydroxide per part of color employed (100% color basis) give full bright prints of the dipyrazolanthronyl colors.

The following examples are given to illustrate the invention. The parts used are by weight.

With the use of the triethanolamine in conjunction with the metallic catalyst the dipyrazolanthronyl dyes are printed with the conventional printing pastes made up with the usual thickeners.

A conventional starch-British gum-thickening paste may be prepared as follows:

100 parts of wheat starch, and
250 parts of British gum, are pasted in
650 parts of water ———
1000 parts This paste is heated to the boil for 10 minutes and cooled to 170° F.

A conventional printing gum may be prepared as follows:

To 650 parts of the starch-British gum-thickener at 170° F., there are added
150 parts of potassium carbonate and
50 parts of glycerin. The paste is then cooled to 140° F., and
150 parts of sodium sulfoxylate-formaldehyde are added, giving ———
1000 parts of printing gum.

Example 1

5 parts of a dyestuff paste of N-N'-diethyldipyrazolanthronyl containing 22% color solids, 10 parts of triethanolamine, 0.2 of a part of ferrous chloride and 84.8 parts of the printing gum, as above prepared, are milled into a smooth paste. Cotton and rayon piece goods may be printed with the above printing paste in the usual manner, dried, aged 5 minutes in a vat color ager of the Mather Platt type, oxidized for 45 seconds in a bath containing 1% sodium bichromate and ½% acetic acid at 120° F., rinsed, soaped for 10 minutes in ½% soap solution at 200° F., then rinsed and dried. The piece goods are thus printed in a deep bluish-red design.

In place of the N-N'-diethyldipyrazolanthronyl the N-methyl-N'-isopropyl-2:2'-dipyrazolanthronyl may be used if a yellower shade is desired than that obtained in Example 1.

Example 2

The following example illustrates the use of a vat dye assistant dye paste containing the triethanolamine and metallic salts already incorported therein. The assistant dye paste may be prepared for use as follows:

100 parts of the vat dye paste of N-N'-diethyldipyrazolanthronyl containing 22% color solids
50 parts of triethanolamine and
1 part of ferrous chloride, are evaporated to drive off
51 parts of water, leaving 100 parts of vat color assistant paste which is milled to insure thorough mixing of the ingredients.

The printing paste is prepared by milling together 20 parts of the above described vat color assistant paste and 80 parts of printing gum (as above prepared). This vat color printing paste when printed on rayon or cotton piece goods as described in Example 1 gives a full bright bluish-red design. Where the cotton or rayon is already dyed with a dischargeable ground color such as the azo dyestuff of Color Index #317, then after printing it is dried, aged, oxidized, soaped, rinsed and dyed as in Example 1, a full bright bluish-red design is obtained on a blue background.

It is to be understood that other thickening pastes and printing gum preparations may be employed with these colors when the triethanolamine and metallic catalyst are employed. The above examples are given merely to illustrate, and not as a limitation upon the invention.

The triethanolamine and metallic salts when used together as above described have been found to very materially improve the printing properties of the alkylated dipyrazolanthronyls which are illustrated by those given in the above examples and which include the symmetrical dipyrazolanthronyls in which the two alkyl groups are identical and the unsymmetrical in which the alkyl groups on the two nitrogen atoms are dissimilar, including those particularly described in copending application of Perkins and Carr, Serial No. 139,100, filed April 26, 1937. The following colors further illustrate the dyes of this class which exhibit good printing properties when printed by this process; N-ethyl-N'-benzyldipyrazolanthronyl, dimethyldipyrazolanthronyl or mixtures of these colors such as a mixture of N-methyl-N'-isopropyldipyrazolanthronyl and N,N'-diethyldipyrazolanthronyl, etc.

I claim:
1. A vat dyestuff printing paste comprising a dyestuff of the group consisting of N,N'-dialkyldipyrazolanthronyls and N-alkyl-N'-aralkyl-dipyrazolanthronyls, triethanolamine and a metallic compound of the group consisting of salts, oxides and hydroxides of a metal of the group consisting of ferrous iron, tin, zinc and copper.

2. A vat dyestuff printing paste comprising a N,N'-dialkyldipyrazolanthronyl, triethanolamine and ferrous chloride.

3. A vat dyestuff preparation for use in textile printing comprising an N,N'-dialkyldipyrazolanthronyl, triethanolamine and a metallic compound of the group consisting of salts, oxides and hydroxides of a metal of the group consisting of ferrous iron, tin, zinc and copper.

4. A vat dyestuff preparation for use in textile printing comprising an N,N'-dialkyldipyrazolanthronyl, triethanolamine and ferrous chloride.

5. A vat dyestuff preparation for use in textile printing comprising N,N'-diethyldipyrazolanthronyl, triethanolamine and a metallic compound of the group consisting of salts, oxides and hydroxides of a metal of the group consisting of ferrous iron, tin, zinc and copper.

6. A vat dyestuff preparation for use in textile printing comprising an unsymmetrical N,N'-dialkyldipyrazolanthrone, triethanolamine and a metallic compound of the group consisting of salts, oxides and hydroxides of a metal of the group consisting of ferrous iron, tin, zinc and copper.

7. A vat dyestuff preparation for use in textile printing comprising N-methyl-N'-isopropyldipyrazolanthronyl, triethanolamine and a metallic compound of the group consisting of salts, oxides and hydroxides of a metal of the group consisting of ferrous iron, tin, zinc and copper.

8. A vat dyestuff preparation for use in textile printing comprising N,N'-dimethyldipyrazolanthronyl, triethanolamine and a metallic compound of the group consisting of salts, oxides and hydroxides of a metal of the group consisting of ferrous iron, tin, zinc and copper.

9. The process of printing textile materials with a vat dyestuff of the group consisting of N,N'-dialkyldipyrazolanthronyls and N-alkyl-N'-aralkyldipyrazolanthronyls which comprises applying said dipyrazolanthronyl dyestuff to said material in a printing preparation containing triethanolamine and a compound of the class consisting of salts, oxides and hydroxides of a metal of the class consisting of iron, tin, zinc and copper.

CHARLES F. MILLER.